(12) United States Patent
Amano et al.

(10) Patent No.: US 6,220,537 B1
(45) Date of Patent: Apr. 24, 2001

(54) FISHING SPINNING REEL HAVING SMOOTHLY SHAPED RAIL PORTION

(75) Inventors: Tomoyuki Amano, Saitama; Shigeto Yamada, Tokyo, both of (JP)

(73) Assignee: Daiwa Seiko, Inc., Tokyo (JP)

( * ) Notice: Subject to any disclaimer, the term of this patent is extended or adjusted under 35 U.S.C. 154(b) by 0 days.

(21) Appl. No.: 09/215,269

(22) Filed: Dec. 18, 1998

Related U.S. Application Data (63) Continuation of application No. 08/813,875, filed on Mar. 7, 1997, now Pat. No. 5,868,331.

(30) Foreign Application Priority Data

Dec. 18, 1997 (JP) ..................................... 9-363902
Dec. 18, 1997 (JP) ..................................... 9-363903

(51) Int. Cl.[7] .................................................. A01K 89/01
(52) U.S. Cl. ................................ 242/231; 29/330; 72/51; 72/368
(58) Field of Search .................................. 242/230, 231, 242/232, 233; 72/367.1, 368, 51

(56) References Cited

U.S. PATENT DOCUMENTS

| 1,019,485 | * | 3/1912 | Koenig ..................................... 72/368 |
| 1,872,276 | * | 8/1932 | Graham ................................... 72/368 |
| 2,774,545 | * | 12/1956 | Chambers ......................... 242/230 X |
| 3,465,567 | * | 9/1969 | Park ........................................ 72/368 |
| 3,670,984 | * | 6/1972 | Lemery ................................. 242/231 |
| 4,562,976 | * | 1/1986 | Ban ....................................... 242/231 |
| 4,577,807 | * | 3/1986 | Urso ................................. 242/230 X |
| 4,706,488 | * | 11/1987 | Williamson ........................... 72/51 X |
| 4,719,679 | * | 1/1988 | Fukuda ................................... 72/368 |
| 4,874,144 |   | 10/1989 | Murakami . |
| 5,216,811 | * | 6/1993 | Jackson et al. ........................ 72/368 |
| 5,261,627 | * | 11/1993 | Shinhara .............................. 242/231 |
| 5,297,410 | * | 3/1994 | Goff .................................. 72/368 X |
| 5,730,377 | * | 3/1998 | Shinohara ............................ 242/231 |
| 5,799,889 | * | 9/1998 | Plestan ................................. 242/231 |
| 5,836,189 | * | 11/1998 | Steubel et al. ........................... 72/51 |
| 5,848,757 | * | 12/1998 | Amano et al. ....................... 242/231 |
| 5,868,331 | * | 2/1999 | Shinohara et al. .................... 242/231 |

FOREIGN PATENT DOCUMENTS

| 0 793 912 | 9/1997 | (EP) . |
| 0 812 536 | 12/1997 | (EP) . |
| 1 452 862 | 12/1966 | (FR) . |
| 3-74260 | 7/1991 | (JP) . |
| 3-117462 | 12/1991 | (JP) . |

* cited by examiner

Primary Examiner—Emmanuel M. Marcelo
(74) Attorney, Agent, or Firm—Liniak, Berenato, Longacre & White (57) ABSTRACT

A fishing spinning reel includes: a reel body; a spool supported on the reel body; a rotor rotatably supported on the reel body for winding a fishing line around the spool; a fishing line guide portion connected to the rotor and movable between a fishing line take-up and a fishing line play-out position; a bail for retrieving the fishing line; and a fishing line introduction portion provided between the bail and the fishing line guide portion. The fishing line introduction portion is formed in such a manner as to have a smooth shape expanding gradually from the bail, and a tightly closed cavity portion is formed in the interior of the fishing line introduction portion.

7 Claims, 9 Drawing Sheets

FISHING SPINNING REEL HAVING SMOOTHLY SHAPED RAIL PORTION

This application is a continuation of U.S. patent application Ser. No. 08/813,875 filed Mar. 7, 1997, now U.S. Pat. No. 5,868,331.

BACKGROUND OF THE INVENTION

1. Field of the Invention

The present invention relates to an improved spinning reel for fishing and, in particular, to an improved fishing line winding device for use in such spinning reel.

2. Description of the Related Art

In a conventional spinning reel for fishing, a fishing line winding device for winding a fishing line around a spool by means of rotation of a handle, as known well, is structured such that a fishing line guide member is supported on a rotor in such a manner as to be set reversibly at a fishing line take-up position and at a fishing line play-out position. However, in the conventional structure, there is found a problem to be solved: that is, in a fishing line take-up operation, the fishing line can be easily entwined around the fishing line guide portion of the fishing line winding device, in particular, around the fishing line guide member due to a twist in the fishing line, the peculiar characteristic of the fishing line, a variation in a tensile force, or the like. As means for preventing the fishing line from being entwined around the fishing line guide portion, as disclosed in Japanese Utility Model Publication No. 3-117462 of Heisei, it is well known to provide a fishing line introduction portion which is gradually expanded from the end portion of a bail toward the fishing line guide portion.

However, in the above-mentioned conventional structure, partly because the fishing line introduction portion of the fishing line guide member is formed of solid material such as stainless steel, duralumin, titanium or the like, the fishing line guide device becomes heavy in weight and thus the spinning reel also becomes heavy in weight. Due to the thus increased weight of the spinning reel, not only the operationability and portability or transportability of the spinning reel are worsened, but also the rotation balance of the rotor is upset so that a fishing line take-up operation in fishing cannot be executed smoothly and lightly.

SUMMARY OF THE INVENTION

The present invention aims at improving the above-mentioned problems found in the conventional spinning reels. Accordingly, it is an object of the invention to provide a spinning reel for fishing in which a fishing line guide member, in particular, a fishing line introduction portion thereof is reduced in weight to thereby be able to not only reduce the weight of the spinning reel but also acquire the balance of the rotation of a rotor.

In attaining the above object, according to the first aspect of the invention, there is provided a fishing spinning reel including: a reel body; a spool supported on the reel body; a rotor rotatably supported on the reel body for winding a fishing line around the spool; a fishing line guide portion connected to the rotor and movable between a fishing line take-up and a fishing line play-out position; a bail for retrieving the fishing line; and a fishing line introduction portion provided between the bail and the fishing line guide portion. The fishing line introduction portion is formed in such a manner as to have a smooth shape expanding gradually from the bail, and a tightly closed cavity portion is formed in the interior of the fishing line introduction portion. Especially, because the fishing line introduction portion is formed integrally with the bail, and also because, in the integral formation of the fishing line introduction portion and bail, in the bail and fishing line introduction portion, there are formed cavity portions in such a manner that they communicate with each other, not only the weight of the fishing line guide member can be reduced further, but also the rotation balance of the rotor can be stabilized further. Also, the number of parts required in the fishing line guide member and the cost thereof can be reduced. Further, when the fishing line guide member is formed by molding a metal pipe into an integrally united body, the light fishing line guide member can be manufactured efficiently and easily.

Further, according to the second aspect of the invention, there is provided a fishing spinning reel including: a reel body; a spool supported on the reel body; a rotor rotatably supported on the reel body for winding a fishing line around the spool; a fishing line guide portion connected to the rotor and movable between a fishing line take-up and a fishing line play-out position; a bail for retrieving the fishing line; and a fishing line introduction portion provided between the bail and the fishing line guide portion. Only the bail or the bail and the fishing line introduction portion are formed into an integral hollow shape by rolling up a plate material. Also, a reinforcing insertion member or a foreign body invasion preventive insertion member is disposed in the whole or in part of the interior of the hollow portion of the bail or bail and fishing line introduction portion. Thanks to this structure, not only the strength of the bail and fishing line introduction portion can be enhanced or foreign bodies such as sand, dust and the like can be prevented from invading into the interior of the hollow portion; but also, since either of the insertion members can be used as a balance weight, the rotation balance of the rotor can be adjusted easily. The cross section shape of the hollow portion may be a closed complete ring shape or a partially cut-away ring shape.

DETAILED DESCRIPTION OF THE PREFERRED EMBODIMENTS

Figure 1:
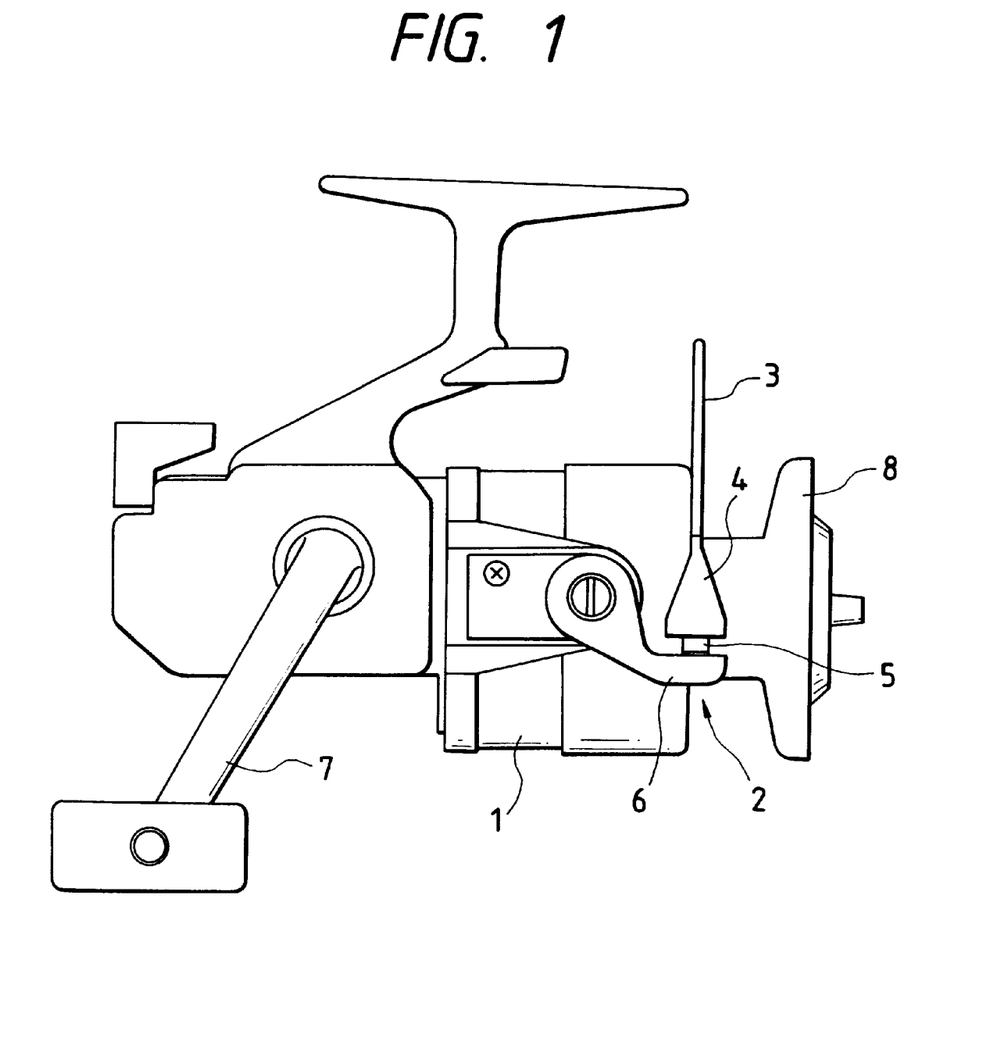
FIG. 1 is a front view of a fishing spinning reel according to the invention.

Now, description will be given below of embodiments of a spinning reel for fishing according to the invention with reference to the accompanying drawings. The present spinning reel for fishing includes a fishing line guide member 2 which, as known well, is reversibly journaled on the two sides of a rotor 1. The fishing line guide member 2 includes a bail 3 having one end thereof journaled on the rotor 1, a fishing line introduction portion 4 which is disposed on the other end of the bail 3 and is used to prevent a fishing line from being entwined, and a fishing line guide portion 6 which supports a guide roller 5 between the fishing line introduction portion 4 and itself and is journaled on the rotor 1. Referring here to the operation of the thus structured fishing line guide member 2, if a handle 7 is turned at the fishing line take-up position of the fishing line guide member 2 so as to turn the rotor 1, then the fishing line can be taken up around a spool 8 through the guide roller 5; and also, if the fishing line guide member 2 is reversed to the fishing line play-out position thereof, then the fishing line can be played out from the spool 8.

Figure 2:
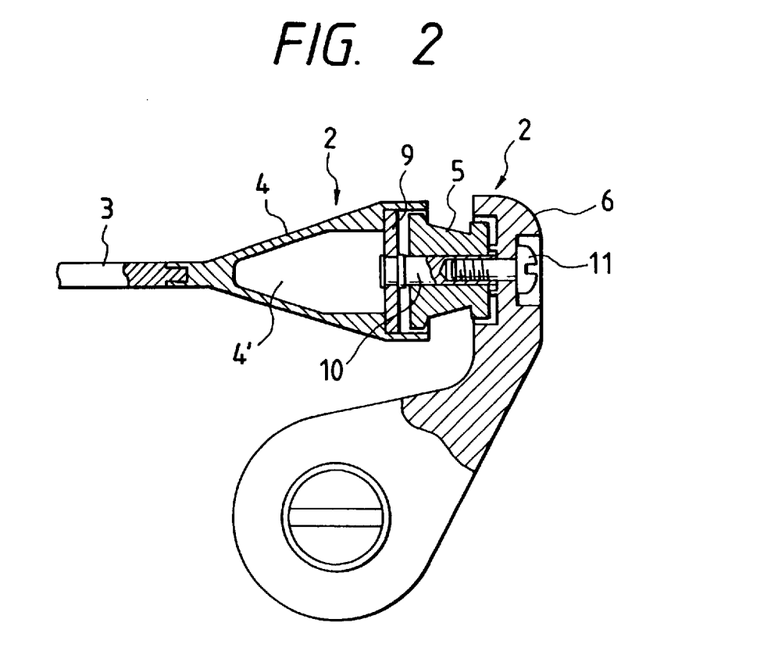
FIG. 2 is a partially cut-away front view of the main portions of the first embodiment.

The bail 3 is formed of solid wire material such as stainless steel, duralmine, aluminum, titanium or the like. Further, the fishing line introduction portion 4 is formed of stainless steel, aluminum, titanium or the like; and, as shown in FIG. 2, the fishing line introduction portion 4 includes a tightly closed cavity portion 4' in the interior portion thereof, while the fishing line introduction portion 4 is formed in a smooth conical shape which expands gradually from the fixing portion thereof with respect to the bail 3 toward the fishing line guide portion 6. Further, between the fishing line introduction portion 4 and the fishing line guide portion 6, there is supported the guide roller 5 through a support shaft 10 projectingly provided on a support plate 9 and also through a mounting screw 11 provided in the fishing line guide portion 6. Therefore, in the fishing line take-up operation, if the rotor 1 is rotated, then the fishing line is introduced and guided from the bail 3 to the fishing line introduction portion 4 so that it can be taken up around the spool 8 by the guide roller 5.

Figure 3:
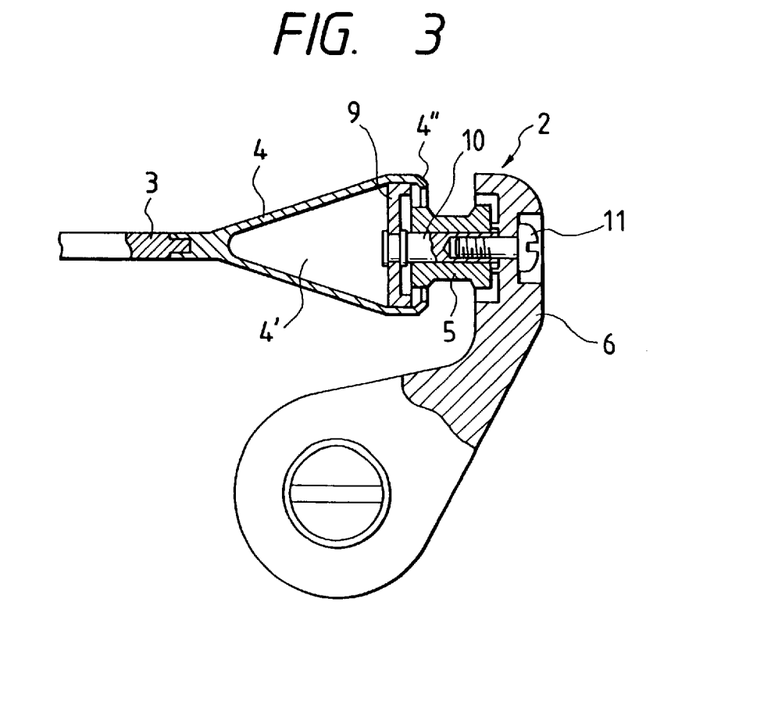
FIG. 3 is a partially cut-away front view of the main portions of a second embodiment.

Now, FIG. 3 shows a second embodiment of a spinning reel for fishing according to the invention. In the second embodiment, the tightly closed cavity portion 4' of the fishing line introduction portion 4 is formed in such a manner that it is similar in shape to the outer shape of the fishing line introduction portion 4, and the support plate 9 is fixed to the fishing line introduction portion 4 after the end edge thereof is curling processed.

Figure 4:
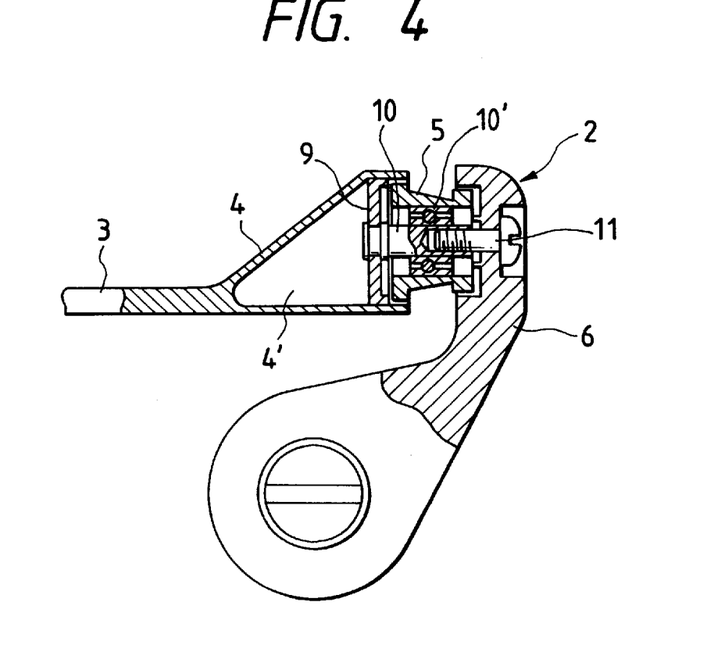
FIG. 4 is a partially cut-away front view of the main portions of a third embodiment.
Figure 5:
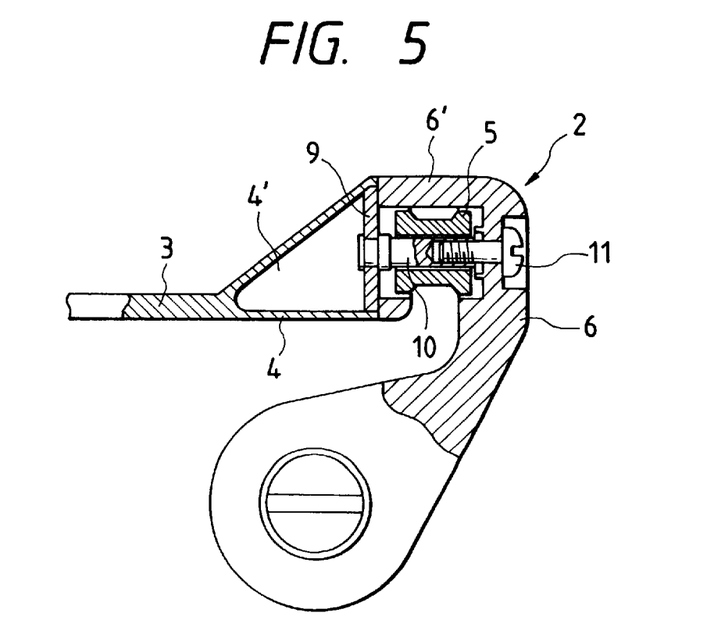
FIG. 5 is a partially cut-away front view of the main portions of a fourth embodiment.

Now, FIGS. 4 and 5 respectively show third and fourth embodiments of a spinning reel for fishing according to the invention. The third and fourth embodiments are respectively modifications of the shape of the cavity portion 4, in which the bail 3 and fishing line introduction portion 4 are formed integrally with each other. In particular, in the third embodiment shown in FIG. 4, the guide roller 5 is supported on the support shaft 10 through a bearing 10'; and, in the fourth embodiment shown in FIG. 5, in the fishing line guide portion 6, there is integrally formed a fishing line entwine preventive frame 6' which faces the fishing line introduction portion 4.

Figure 6:
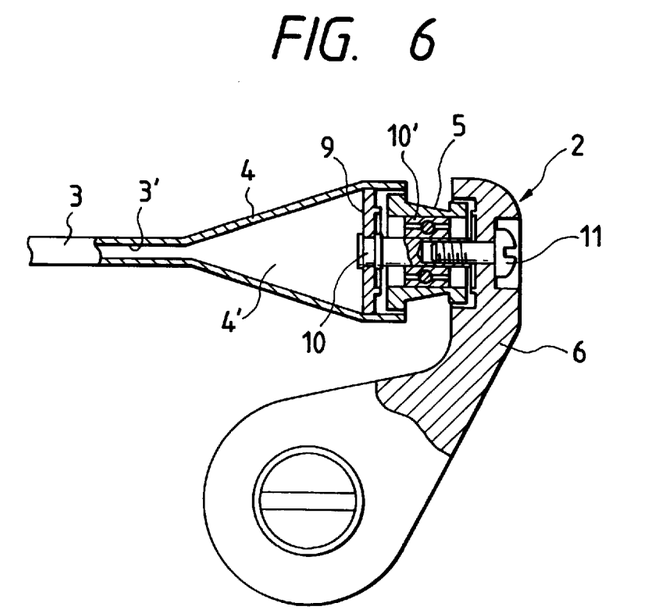
FIG. 6 is a partially cut-away front view of the main portions of a fifth embodiment.
Figure 7:
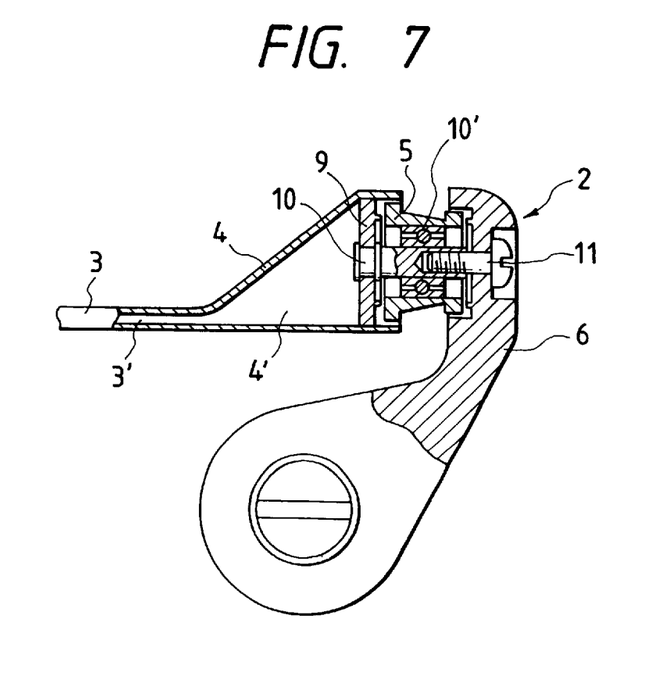
FIG. 7 is a partially cut-away front view of the main portions of a sixth embodiment.
Figure 8:
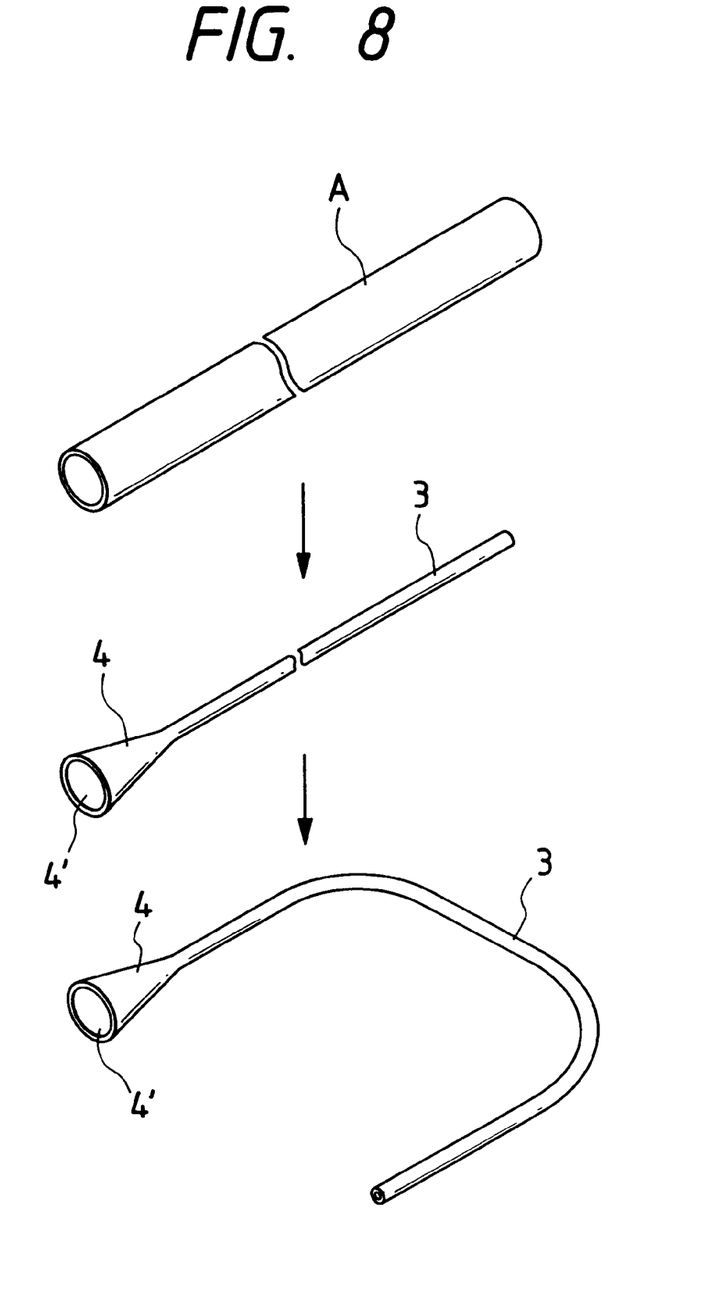
FIG. 8 is a explanatory view of a process for manufacturing the fifth embodiment.

FIGS. 6 and 7 respectively show fifth and sixth embodiments of a spinning reel for fishing according to the invention. In the respective embodiments, the bail 3 and fishing line introduction portion 4, as shown in a molding process in FIG. 8, are formed as an integrally united body by working a metal pipe A in such a manner their respective cavity portions 3' and 4' communicate with each other; and, in FIG. 6, the fishing line introduction portion 4 is formed in a conical shape, whereas, in FIG. 7, the conical shape of the fishing line introduction portion 4 shown in FIG. 6 is modified.

As in the third to sixth embodiments, when the bail 3 and fishing line introduction portion 4 are formed as an integrally united body, then the number of parts required when the fishing line guide member 2 is assembled can be reduced, which, conveniently, not only can simplify the manufacturing process thereof but also can reduce the manufacturing cost thereof. Especially, when the bail 3 and fishing line introduction portion 4 are formed of a metal pipe into an integrally united body in such a manner that their respective cavity portions 3' and 4' are in communication with each other, then the weight of the fishing line guide member 2 can be reduced further and the rotation balance of the rotor 1 can also be stabilized further.

Figure 9:
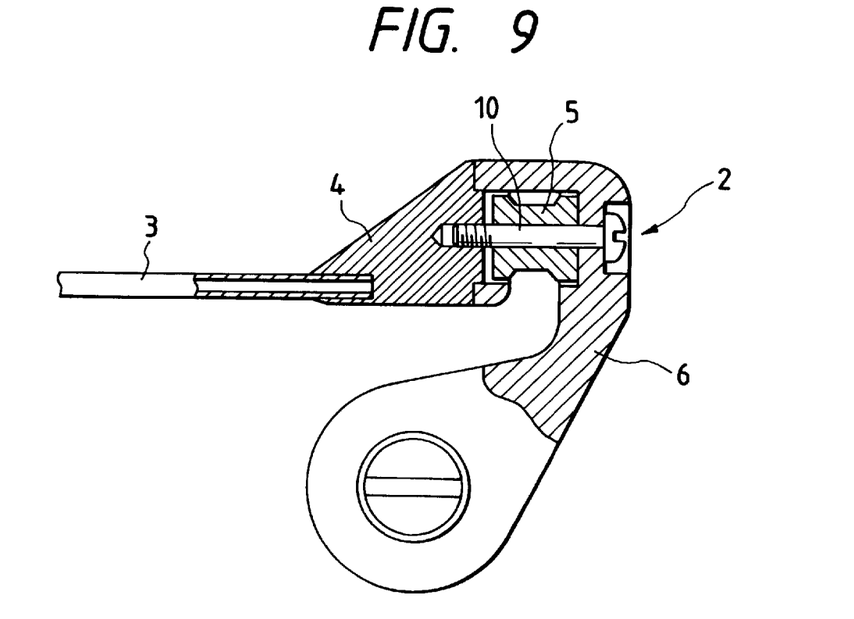
FIG. 9 is a partially cut-away front view of the main portions of a seventh embodiment.
Figure 14:
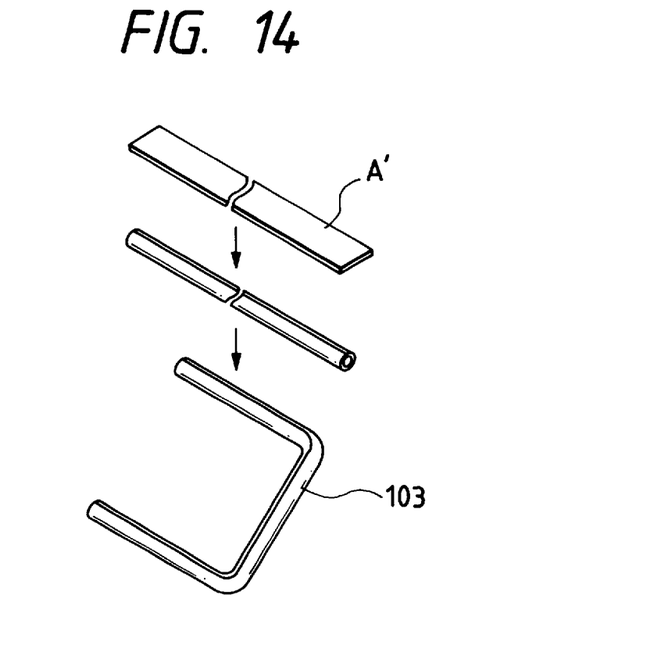
FIG. 14 is a explanatory view of a process for manufacturing the seventh embodiment.

FIG. 9 shows a seventh embodiment of a spinning reel for fishing according to the invention. In the form of the bail of the embodiment, a plate material A' formed of stainless steel, duralmine, aluminum, titanium or the like, as shown in FIG. 14, is rolled up and bent into a hollow shape having a ring-shaped cross section. The solid fishing line introduction portion 4, which is fixed integrally to the end portion of the thus formed bail 3, is removably fixed to a support shaft 10 of the guide roller 5 of the fishing line guide portion 6, thereby constituting the fishing line guide member 2.

Therefore, if the bail 3 is formed into a hollow shape having a ring-shaped cross section in the above-mentioned manner, then the weight of the fishing line guide member 2 can be reduced to the reduced weight of the bail 3. This not only can facilitate the fishing operation and the carrying or transportation of the fishing reel, but also can stabilize the rotation balance of the rotor 1 with the fishing line guide member 2 mounted thereon, so that the fishing operation can be executed smoothly and easily.

Figure 10:
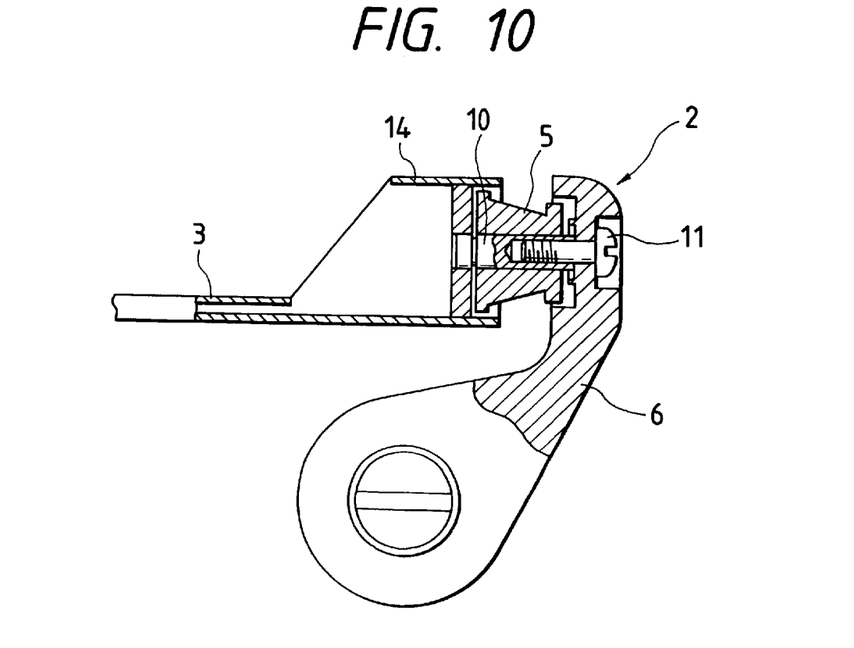
FIG. 10 is a partially cut-away front view of the main portions of an eighth embodiment.
Figure 11:
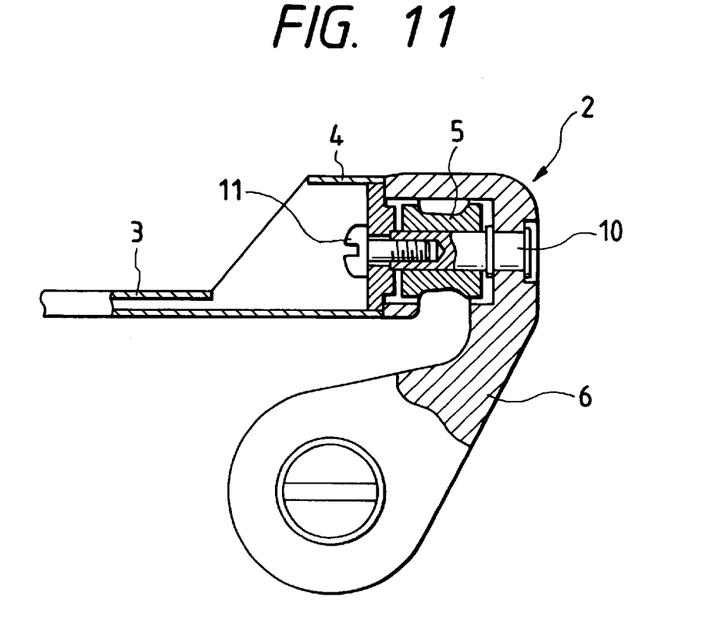
FIG. 11 is a partially cut-away front view of the main portions of a ninth embodiment.
Figure 15:
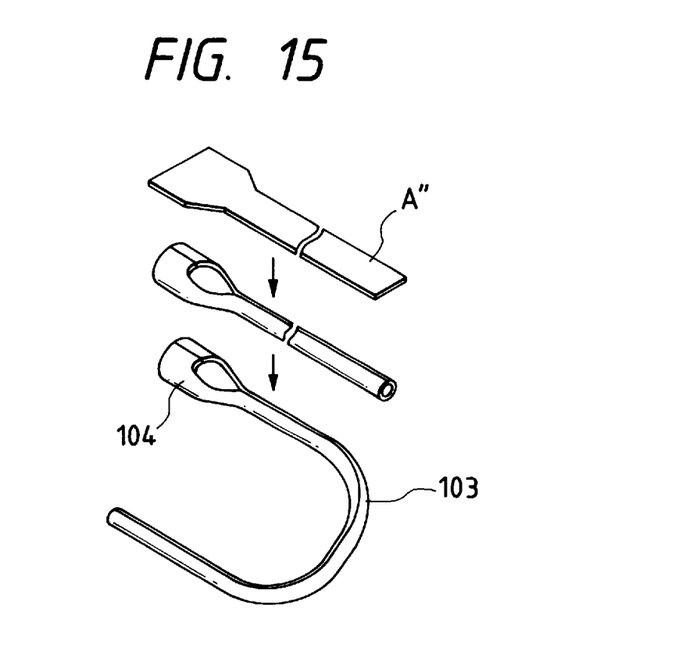
FIG. 15 is a explanatory view of a process for manufacturing the eighth to tenth embodiments of the invention.

FIG. 10 shows an eighth embodiment of a spinning reel for fishing according to the invention. In the eighth embodiment, as shown in FIG. 15, a plate material A" is rolled up to thereby form a hollow shape in which the bail 3 and the fishing line introduction portion 4 are formed as an integrally united body, and the fishing line introduction portion 4 is removably fixed to the fishing line guide portion 6 by a mounting screw 11 used to fix or mount a support shaft 10 of the guide roller 5, which is provided on and projected from the fishing line introduction portion 4, to the fishing line guide portion 6. And, in a ninth embodiment of a spinning reel for fishing according to the invention shown in FIG. 11, the support shaft 10 of the guide roller 5 employed in the eighth embodiment is projectingly provided on the fishing line guide portion 6, and the fishing line introduction portion 4 is removably fixed to the fishing line guide portion 6 by a mounting screw 11 which is used to fix the support shaft 10 of the guide roller 5 to the fishing line introduction portion 4. As in the eighth and ninth embodiments, when the bail 3 and fishing line introduction portion 4 are formed as an integrally united and hollow shape, not only the weight of the fishing line guide member 2 can be reduced further but also the number of parts required in this portion and the cost of the fishing line guide member 2 can be reduced.

Figure 12:
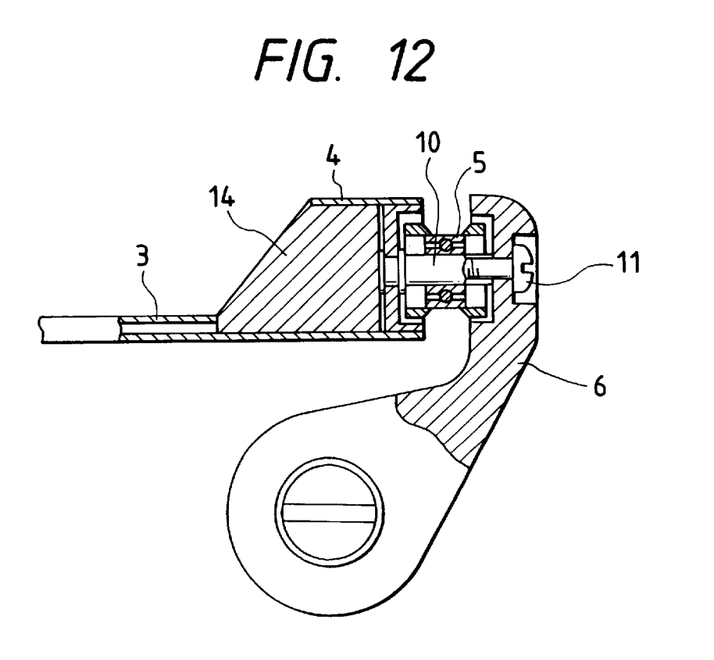
FIG. 12 is a partially cut-away front view of the main portions of a tenth embodiment.

Further, in a tenth embodiment of a spinning reel for fishing according to the invention shown in FIG. 12, a foreign body invasion preventive insertion member 14 is loaded into and fitted with the hollow interior portion of the fishing line introduction portion 4 in the eighth and ninth embodiments to thereby prevent foreign bodies such as sand, dust, chum and the like from invading into the fishing line introduction portion 4 from the end portion of the fishing line introduction portion 4.

Figure 13A:
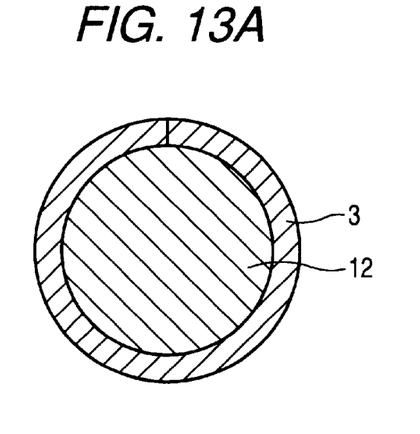
FIGS. 13A to 13C are section views of a bail employed in the seventh to tenth embodiments of the invention.
Figure 13B:
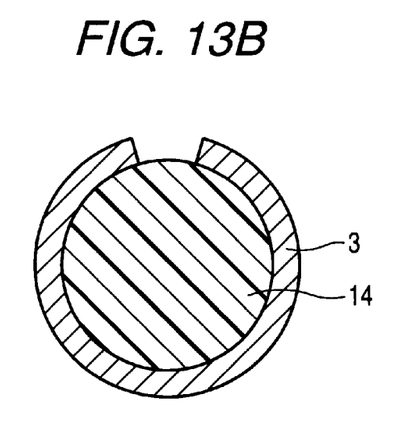
Figure 13C:
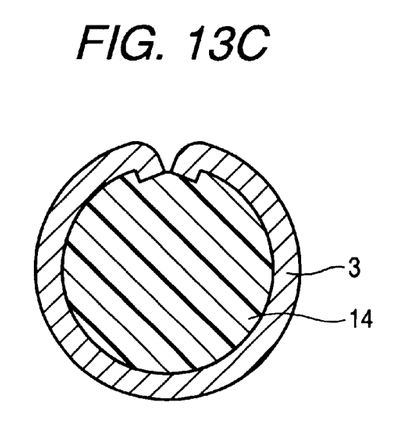

By the way, in the seventh to tenth embodiments, when the hollow portion of the bail 3 is formed in such a manner as to have a closed-ring-shaped cross section as shown in FIG. 13A, in order to reinforce the strength thereof, it is also possible to load and fit a strength reinforcing insertion member 12 formed of aluminum, reinforced synthetic resin or the like into the hollow portion of the bail 3. Also, as shown in FIGS. 13B and 13C, when the cross section of the hollow portion of the bail 3 is formed as a ring shape with a portion thereof cut away, foreign bodies such as seawater, sand, dust, chum and the like are easy to invade into the hollow interior portion of the bail 3 from the cut-away portion of the ring. Therefore, to prevent the invasion of the foreign bodies, preferably, a foreign body invasion preventive insertion member 14 formed of soft synthetic resin or the like may be inserted into the hollow portion of the bail 3.

As has been described heretofore, in a spinning reel for fishing according to the first aspect of the invention, since the fishing line introduction portion of the fishing line guide member is formed in such a manner as to have a smooth shape expanding gradually from the bail, and a tightly closed cavity portion is formed in the interior of the fishing line introduction portion, not only the fishing line can be smoothly and easily guided to the fishing line guide portion before the fishing line can be taken up, but also the fishing line guide member can be reduced in weight to thereby be able to reduce the weight of the reel main body as well as can stabilize the rotation balance of the rotor. As a result of this, in fishing, the operation efficiency of the spinning reel can be enhanced and the spinning reel can be made easy to carry.

Also, if the bail and fishing line introduction portion are formed as an integrally united body, then the number of parts required when the fishing line guide member is assembled can be reduced and the cost of the fishing line guide member can also be reduced.

Further, if, not only in the interior of the fishing line introduction portion but also in the interior of the bail, there are formed tightly closed cavity portions in such a manner that the two cavity portions are in communication with each other, then the weight of the fishing line guide member can be reduced further and also the rotation balance of the rotor can be stabilized, so that the fishing operation can be carried out more smoothly and easily. Especially, because the bail and fishing line introduction portion are formed of a metal pipe into an integrally united body, in the bail and fishing line introduction portion, mutually communicating cavity portions can be formed simply and easily, which can simplify the manufacturing process of a light weight fishing line guide member.

Further, according to the second aspect of the invention, since the bail of the fishing line guide member of the spinning reel for fishing is formed hollow, the bail can be reduced in weight and thus the whole rotor can be reduced in weight, which results in the reduced weight of the reel main body. This not only can facilitate the fishing operation of the spinning reel as well as portability and transportability of the spinning reel, but also can stabilize the rotation balance of the rotor, which makes it possible to carry out the fishing operation more smoothly and easily.

Also, according to the third aspect of the invention, because the above-mentioned bail and fishing line introduction portion are formed together into an integrally united and hollow shape, the weight of the bail and fishing line introduction portion of the fishing line guide member can be reduced further and, at the same time, the number of parts required in the bail and fishing line introduction portion of the fishing line guide member as well as the manufacturing cost of the fishing line guide member can also be reduced.

Further, when the strength reinforcing insertion member or foreign body invasion preventive insertion member is loaded into the hollow portion of the bail or fishing line introduction portion, not only the strength of the fishing line guide member including the bail portion thereof can be enhanced and the foreign bodies such as seawater, sand, dust, chum and the like can be prevented from invading into the hollow portion, but also, in either case, such insertion members can be used as a balance weight, which makes it possible to adjust the rotation balance of the rotor with ease.

While only certain embodiments of the invention have been specifically described herein, it will be apparent that numerous modifications may be made thereto without departing from the spirit and scope of the invention.

What is claimed is:

1. A fishing spinning reel comprising:

a reel body;

a spool supported on the reel body;

a rotor rotatably supported on the reel body for winding a fishing line around the spool;

a fishing line guide portion connected to the rotor and movable between a fishing line take-up and a fishing line play-out position;

a bail for retrieving the fishing line; and a fishing line introduction portion provided between the bail and fishing line guide portion, wherein the bail and the fishing line introduction portion are formed into an integral hollow shape by rolling up a plate material, and wherein said bail and fishing line introduction portion comprise a rolled plate material having a seam defined by opposing edges of said plate material.

2. A fishing spinning reel as set forth in claim 1, wherein the plate material includes a wide-width portion at one end thereof so as to form the fishing line introduction portion.

3. A fishing spinning reel as set forth in claim 1, wherein a hollow portion formed in the bail and the fishing line introduction portion includes a strength reinforcing insertion member in the interior thereof.

4. A fishing spinning reel as set forth in claim 1, wherein a hollow portion formed in the bail and the fishing line introduction portion has a cut-away portion partially cut away the hollow portion having a ring shape in cross section, and a foreign body invasion preventive insertion member is disposed in the interior of the hollow portion provided with the cut-away portion.

5. A fishing spinning reel comprising:

a reel body;

a spool supported on the reel body;

a rotor rotatably supported on the reel body for winding a fishing line around the spool;

a fishing line guide portion connected to the rotor and movable between a fishing line take-up and a fishing line play-out position;

a bail for retrieving the fishing line; and a fishing line introduction portion provided between the bail and fishing line guide portion, wherein the bail is formed into a hollow shape by rolling up a plate material, and wherein said bail comprises a rolled plate material having a seam defined by opposing edges of said plate material.

6. A fishing spinning reel as set forth in claim 5, wherein a hollow portion formed in the bail includes a strength reinforcing insertion member in the interior thereof.

7. A fishing spinning reel as set forth in claim 5, wherein a hollow portion formed in the bail has a cut-away portion partially cut away the hollow portion having a ring shape in cross section, and a foreign body invasion preventive insertion member is disposed in the interior of the hollow portion provided with the cut-away portion.

* * * * *